T. C. DOBBINS.
REPAIR DEVICE FOR PNEUMATIC TIRES, &c.
APPLICATION FILED SEPT. 18, 1911.
1,065,787.
Patented June 24, 1913.
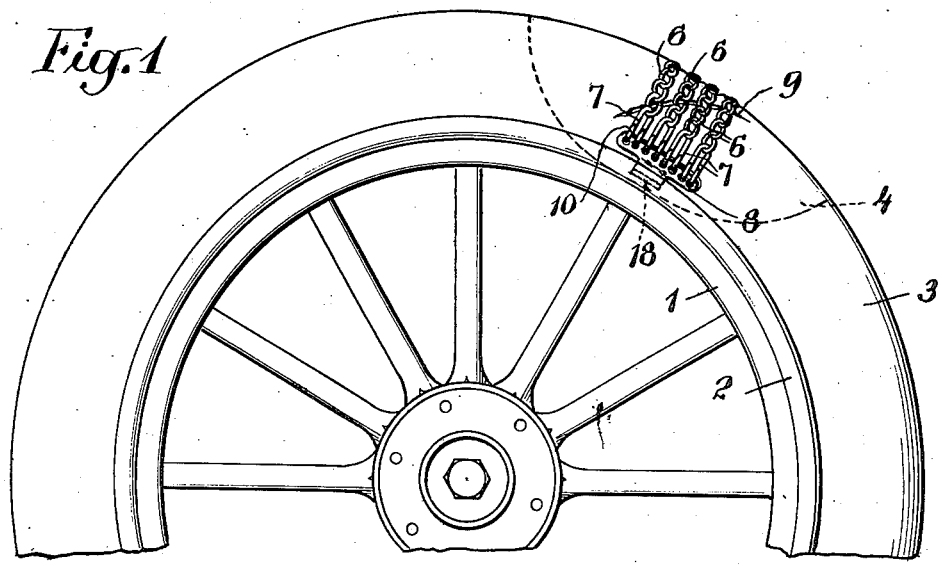
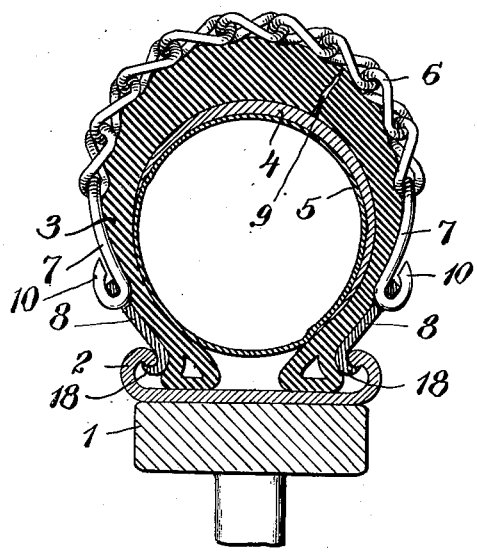
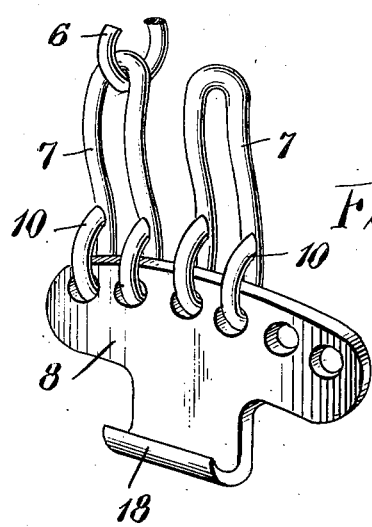
WITNESSES
Timothy C Dobbins INVENTOR
BY
Duncan & Duncan ATTORNEYS

UNITED STATES PATENT OFFICE.

TIMOTHY C. DOBBINS, OF LOS ANGELES, CALIFORNIA.

REPAIR DEVICE FOR PNEUMATIC TIRES, &c.

1,065,787.   Specification of Letters Patent.   Patented June 24, 1913.

Application filed September 18, 1911. Serial No. 649,933.

*To all whom it may concern:*

Be it known that I, TIMOTHY C. DOBBINS, a citizen of the United States, and resident of Los Angeles, Los Angeles county, California, have made certain new and useful Inventions Relating to Repair Devices for Pneumatic Tires, &c., of which the following is a specification, taken in connection with the accompanying drawing, forming part of the same.

This invention relates to repair devices for pneumatic tires comprising anchor plates preferably having central lips or hooks coöperating with the clencher rim and a series of flexible irregular shaped retaining members or chains secured to said plates and adapted to embed themselves sufficiently in the pneumatic tire when it is inflated to securely hold it in position adjacent the puncture or blow-out, there being, if desired, a suitable patch of reinforced rubber or the like inserted between the tire shoe and its inner tube to reinforce the parts and minimize abrasion.

In the accompanying drawing showing in a somewhat diagrammatic manner an illustrative embodiment of this invention, Figure 1 shows the repair device as applied to a pneumatic tire. Fig. 2 is an enlarged cross-section through the tire and device; and Fig. 3 is an enlarged perspective view of one of the anchor plates arranged for three chains.

In the illustrative embodiment of the invention shown in the accompanying drawing the pneumatic tire 3 is shown as coöperating in the usual way with the clencher rim 2 mounted on the felly 1 of the wheel. This shoe is shown as having a large puncture or tear 9 therein and the repair patch 4 of reinforced rubber or the like is indicated as inserted within the tire shoe adjacent this puncture so as to reinforce the tire at this point and prevent the inner tube 5 from coming into injurious contact with the roughened shoe at the puncture. The external repair device may as indicated comprise the two anchor plates 8, which may be formed of steel or other suitable material, and which are curved to closely conform to the adjacent surface of the tire and preferably provided with relatively narrow centrally located holding or securing devices of any desired character to have corresponding holding action on any part of the wheel and which may each be in the form of a suitable anchor lip or hook 18 to engage and securely hold upon the inturned flange of the clencher rim when inserted between the shoe and rim when the tire is deflated. A series of flexible irregular shaped gripping securing or retaining members, such, for instance, as the hardened steel curb chains 6 may be connected with the anchor plates preferably in a detachable manner, as by the double attaching hooks 7, one of which may be connected with each end of one of the chains 6 and provided with ends 10 which may pass through suitable holes in the anchor plate and be bent around as indicated to securely hold the parts together. Any desired number of such retaining members may be connected with a corresponding sized anchor plate, devices having two, three, four or more chains, each being useful for various sized blow-outs and punctures, although for general purposes a four-chain repair device of this character has proved of general utility.

In repairing a weakened spot in the tire or an incipient blow-out the tire chains may be applied alone after deflating the tire without the necessity of using an inner patch of any kind, the anchor plates being forcibly inserted in any way between the tire shoe and clencher flanges on each side of the tire and then on inflating the tire in the usual way the chains and connected parts become considerably embedded in the tire shoe so as to exert a strong retaining action thereon and not only prevent excessive working or movement of the parts with respect to the tire under service conditions, but also to minimize the normal resilient movement of this part of the tire so as to correspondingly prevent further tire damage.

By providing the anchor plates with narrow central hooks or securing devices the plates are free to swing or oscillate slightly about such securing means as the connected chains move into contact with the road surface so as to further minimize working or cutting. In the case of punctures especially when large repair devices give best results when used in connection with an internal patch such as indicated, and in this way a seriously damaged tire can be quickly and easily repaired without expert assistance so as to secure hundreds of miles of further service from the tire if necessary. Indeed, it is possible by the use of several such repair devices to use a pneumatic tire in which the shoe has been entirely severed in a more or less diagonal direction, while in the case of ordinary blow-outs the tire is so reinforced by the repair device that this portion of the tire is apt to outlast the other portions of the same tire under normal conditions.

Preferably, as indicated in Fig. 1 the retaining chains are normally sufficiently embedded in the tire tread so as not to project to any appreciable extent beyond the normal tread surface which not only minimizes wear on these parts, but also gives a smoother action to the vehicle because bumping on the chains is thereby minimized. It is of course understood that the length of the retaining members may be readily varied, for instance, by removing the attaching hooks 7 and inserting them in another link of the chains before again securing the hooks to the corresponding anchor plate and if desired the chains may be provided with one or more extra links beyond what are necessary for small tires, so as to allow the effective length of the chains to be correspondingly adjusted and the repair device fitted to tires of different size.

This case contains subject matter taken from my co-pending application No. 623,613, filed April 27, 1911.

Having described this invention in connection with illustrative embodiments, forms, proportions, materials, and arrangements of parts, to the details of which disclosure the invention is not of course to be limited, what is claimed as new and what is desired to be secured by Letters Patent is set forth in the appended claims.

1. As a new article of manufacture, a tire repairing device comprising a plate adapted to lie in proximity to the tire alongside the rim and to detachably engage the latter, a similar plate adapted to lie upon the opposite side of the same portion of the tire, engaging the rim in like manner, and a series of slightly separated chains passing around the exposed surface of said portion and having their ends detachably connected to said plates, respectively.

2. The combination with a wheel rim and a pneumatic tire thereon, of an internal flexible patch for the tire, of a series of slightly separated chains connected with the rim upon opposite sides of the tire and passing around and binding closely that portion of the tire within which the patch lies; whereby the inner surface is protected and the body of the tire is held against material movement in any direction.

3. A tire repairing device comprising a relatively narrow plate adapted to lie alongside the wheel rim, conforming to the adjacent surface of the tire, and provided with a central hook to pass inward alongside the tire and detachably engage the inturned rim flange, a like plate adapted to be engaged in like manner on the opposite side of the same portion of the tire, and a series of slightly separated chains having their ends in detachable hooked engagement with the plates, respectively, and adapted to pass over said portions of the tire; whereby both the tread and the lateral surfaces of the tire are indented and the parts of the tire within the chains are held against material movement.

4. The tire repair device comprising a pair of anchor plates adapted to coöperate with the opposite sides of the tire and each provided with holding means adapted to coöperate with the inturned flange of the clencher rim of the pneumatic tire when inserted between the rim and tire, and a series of securing chains connected to said anchor plates and adapted to closely embrace and embed themselves in the resilient pneumatic tire under operating conditions.

5. The tire repair device comprising anchoring means secured to the wheel and adapted to coöperate with the sides of the tire and a series of relatively movable irregular shaped gripping securing members connected to said anchoring means and adapted to embrace and to embed themselves in adjacent parts of the resilient pneumatic tire under operating conditions.

6. The tire repair device comprising a pair of anchor plates adapted to coöperate with the opposite sides of the tire and each provided with holding means adapted to coöperate with the rim portions of the wheel and a series of securing chains adjustably connected to said anchor plates and adapted to closely embrace the resilient pneumatic tire under operating conditions.

7. The combination with a clencher rim and a coöperating pneumatic tire, of a series of securing curb chains and a pair of connected anchoring plates curved to substantially conform to the sides of the tire and having central holding means coöperating with the clencher rim to hold the chains in close gripping engagement with the adjacent portion of the tire so as to embed them therein and hold the same against undesirable movement.

8. The combination with a wheel rim and a coöperating pneumatic tire, of a series of relatively movable irregular shaped gripping securing members and connected anchoring means secured to the wheel on the sides of the tire to hold said securing members in close gripping engagement with the adjacent portion of the tire so as to embed them therein and hold the same against undesirable movement.

9. The combination with a wheel rim and a coöperating pneumatic tire, of chain securing means and connected anchoring means secured to the wheel to hold said chain securing means closely against and embedded in the adjacent portion of the tire and prevent undesirable movement of such portion of the tire.

10. The combination with a wheel rim and a coöperating pneumatic tire, of gripping securing means having relatively yieldable portions and connected anchoring devices secured to the wheel on the sides of the tire to hold said securing means in close gripping engagement extending across the tread portion of the tire so as to be embedded therein and hold the same against undesirable movement.

11. The tire repair device comprising anchoring devices adapted to be secured to the wheel to coöperate with the sides of the tire and chain securing means having relatively movable portions connected to said anchoring devices and adapted to embrace and extend across the tread portion of the resilient tire to embed itself therein under operating conditions.

12. The tire repair device comprising anchoring devices adapted to be secured to the wheel to coöperate with the tire and gripping securing means having relatively movable portions connected to said anchoring devices and adapted to embrace and extend across the tread portion of the resilient tire and embed itself therein under operating conditions to prevent undesirable movement of such portion of the tire.

TIMOTHY C. DOBBINS.

Witnesses:
HARRY L. DUNCAN,
JESSIE B. KAY.